United States Patent [19]
Denison et al.

[11] 3,787,163

[45] Jan. 22, 1974

[54] POWERED ICE CREAM DIPPER

[76] Inventors: Neil E. Denison, 300 S. Straughan, Apt. 704, Boise, Idaho 83702; Edward E. McCullough, Box 46, Brigham City, Utah 84302

[22] Filed: Dec. 29, 1971

[21] Appl. No.: 213,263

[52] U.S. Cl............... 425/280, 425/282, 425/187
[51] Int. Cl............................................. A23g 5/02
[58] Field of Search... 425/276, 279, 280, 281, 282, 425/318, 187; 30/324, 272

[56] References Cited
UNITED STATES PATENTS

| | | | |
|---|---|---|---|
| 1,732,328 | 10/1929 | Cox | 425/284 |
| 2,540,397 | 2/1951 | Lawrence et al. | 425/280 X |
| 1,971,577 | 8/1934 | Parker | 425/281 |
| 2,715,175 | 8/1955 | Jacobson | 425/282 |
| 3,358,619 | 12/1967 | Pareira | 425/276 |
| 2,160,023 | 3/1939 | Kelly | 425/281 X |
| 3,189,998 | 6/1965 | Beisheim et al. | 30/272 A |
| 3,315,356 | 4/1967 | Swanke et al. | 30/272 A |
| 3,604,114 | 9/1971 | Swanke et al. | 30/272 A |
| 1,588,413 | 6/1926 | Hardy | 425/280 |
| 2,439,125 | 4/1948 | Bolinger | 425/280 |

Primary Examiner—Robert D. Baldwin
Assistant Examiner—David S. Safran
Attorney, Agent, or Firm—Edward E. McCullough

[57] ABSTRACT

Dipper apparatus that fits as an attachment on an electric knife handle has an arm, rigidly attachable thereto, that pivotally holds a scoop member, and means for transferring reciprocating motion from the actuators in the knife handle to the scoop, whereby it may be rotated through a small arc. The scoop member is preferably less than hemispherical, being laterally narrowed. It also has sharpened and serrated edges, and may be electrically heated to facilitate removal of ice cream therefrom.

9 Claims, 4 Drawing Figures

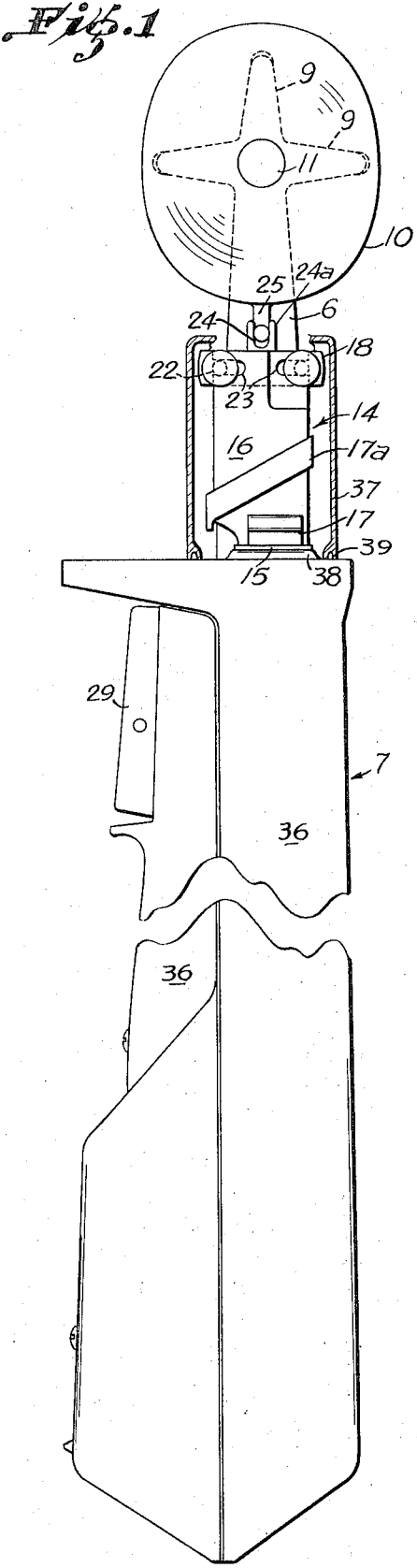
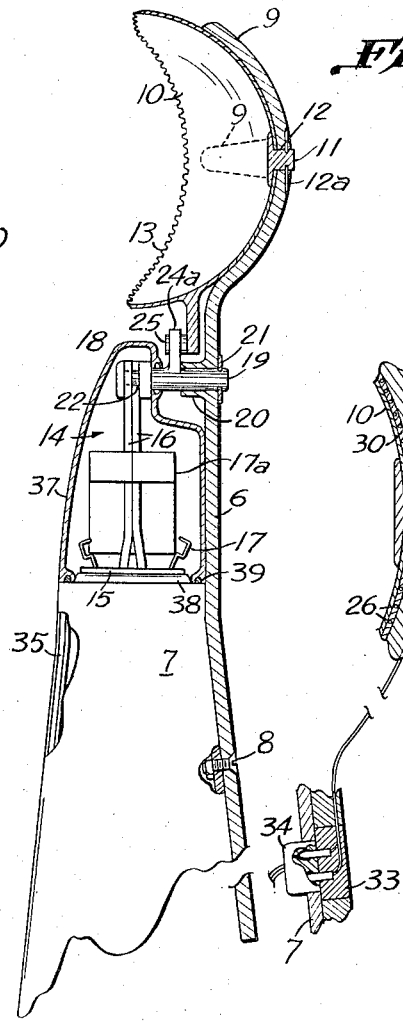
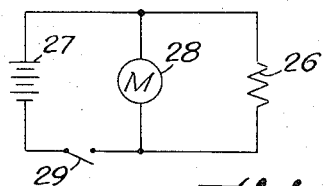
Fig.1  Fig.2  Fig.3  Fig.4
INVENTORS
Neil E. Denison
Edward E. McCullough
By: Edward E. McCullough
AGENT

POWERED ICE CREAM DIPPER

BACKGROUND OF THE INVENTION

This invention relates to powered ice cream dippers, and particularly to dipper attachments with electric knife handles.

Conventional dippers for dipping ice cream are generally of two types. One is a hollow structure comprising a handle fixed to a less than hemispherical scoop, the structure being filled with a liquid antifreeze that conducts heat to facilitate release of the ice cream. The other type comprises a handle fixed to a hemispherical scoop member, and is equipped with a mechanical linkage that causes a semicircular bail to sweep the inner surface of the scoop member to release the ice cream. Both types of scoop depend on sheer physical force in scooping hard ice cream which, because of its viscous consistency, becomes very difficult to penetrate when frozen solid.

Electrically powered scoops are known in the prior art and are described in U. S. Pats. such as Nos. 2,439,125 to G. N. Bolinger; 2,571,729 to B. F. Lawrence et al.; 2,714,862 to S. Gargano; and 2,621,614 to E. A. Walling. A number of disadvantages have been noted in these inventions of the prior art. All of them that are intended to form balls of ice cream have substantially hemispherical scoop members that tend to retain the ice cream. The releasing devices are all variations of the conventional movable bails, which are intended to remove the ice cream by sweeping the inner surface of the scoop member. These devices are both inconvenient to clean and are relatively ineffective in releasing ice cream easily. In addition, these inventions are all equipped with electric cords that become nuisances in food handling operations and always present the threat of electrical shock.

SUMMARY OF THE INVENTION

The present invention, which overcomes these disadvantages of the prior art, is an ice cream dipper apparatus that is attachable to a conventional electric knife handle. An arm that clamps onto the side of the knife handle pivotally holds a scoop member that is somewhat less than hemispherical in form. Curved, radially extending fingers on the arm support the scoop member and confine its movements to rotary motion about its pivotal attachment to the arm. A motion adapting mechanism, connected to the scoop member, plugs into reciprocating receptacles in the knife handle to transfer the motion thereof to the scoop to cause it to rotate through a small arc reciprocally. The scoop member may be equipped with an electrical resistance wire, connected to the power source used by the knife handle, for parallel connection thereof with the motor of the knife handle. When in operation, the resistance wire on the scoop member raises the temperature of that member to slightly above the melting point of ice cream to perform the dual functions of: (1) assisting somewhat in penetrating the frozen ice cream; and (2) insuring easy release of the ice cream after it has been dipped.

Objects of the invention are to provide an ice cream dipper that greatly decreases the physical labor involved in dipping hard ice cream; that is easy to clean and convenient to use; and that will release the ice cream without additional effort on the part of the operator. Important features of the invention are that it is simple in construction, reliable, and safe to use. Another important feature is that it is an inexpensive appliance attachable to a conventional component.

Other objects and advantages of the invention will become apparent as the following detailed description is read with reference to the accompanying drawings, wherein the same parts are designated by the same numbers throughout the disclosure.

DESCRIPTION OF THE DRAWINGS

In the drawings:

FIG. 1 is a front view, partially in section, of the invention;

FIG. 2 is a side view, partially in section, of the invention;

FIG. 3 is an enlarged, fragmentary view showing details of a heated scoop member; and FIG. 4 is a schematic wiring diagram of the electrical system.

DESCRIPTION OF THE PREFERRED EMBODIMENTS

As shown in FIGS. 1 and 2, the invention has an arm 6 that may be fastened at its inner end to the electric knife handle 7 by screws 8 or by other attachment means. The outer end of the arm 6 has curved, radially extending fingers 9 to support a scoop member 10 and restrict its movement. The scoop 10 is a concavo-convex shell, somewhat less than hemispherical in form, the lateral sides being cut away or indented to assist in removal of ice cream therefrom with lateral motion by the operator. A large headed pin 11 centrally fixed to the scoop 10, projects through a hole 12 in the arm 6. An E-ring 12a in a groove secures the pin 11 to the arm 6. The edges 13 of the scoop 10 are sharpened and serrated, in the preferred embodiment, to facilitate cutting through frozen ice cream. Also, the scoop may be coated with a release agent, such as Teflon or a silicone, to facilitate further its movement through the ice cream and release of the ice cream therefrom.

A motion adapting mechanism 14, or means for transferring reciprocal motion of the knife handle actuators to the scoop, operatively connects the scoop 10 to reciprocating receptacles 15 of actuators in the knife handle, to which knife blades are normally attached. A pair of parallel, reciprocal bars 16 fit into the receptacles 15 and are held therein by spring clips 17 in the manner ordinarily used for knife blades. The clips 17 may be eliminated, however without impairing the function of the device. Although there are a number of ways in which the bars 16 may engage the actuators of the knife handle, a typical embodiment is shown in U. S. Pat. No. 3,315,356, FIGS. 1, 2, and 3. Guard blocks 17a are also the same as those conventionally used on knife blades to keep foreign particles out of the receptacles 15. A yoke 18 is pivotally attached at its center to the arm 6 by a central stud 19 that extends through a short bushing 20 fixed in the arm 6. The stud 19 is held in place by an E-ring 21 that fits in a groove therein. A large headed stud or screw 22 extending outward from each end of the yoke engages a slot 23 in the outer end portion of each bar 16, so that reciprocal motion of the bars 16 bearing against the yoke via the studs 22 may impart reciprocating, rotary motion to the yoke about its pivot 19. In this stud-in-slot means for transferring motion from the yoke 18 to the scoop 10, the slots could be located equally well in the yoke 18 and the studs 22 could be on the reciprocating bars 16. A lug 24a fixed to the stud 19 has a radial slot 24 that engages a driving means in the form of a crank 25 on the scoop member 10, whereby rotary motion of the yoke may be transferred to the scoop member. Hence the lug with its slot 24 provides a means for engaging the driving means of the scoop. In this crank-in-slot engagement means, the crank could as well be fixed to the stud 19 and the lug with its slot could be on the scoop member 10.

As shown in FIGS. 3 and 4, another method of insuring release of the ice cream from the scoop member is by electrically heating the scoop. In this embodiment, an electrical resistance wire 26, or other heating element, is connected to the energy source 27, preferably a battery, that operates the motor 28 of the knife handle. A common switch 29 is used so that the scoop 10 may be heated only when the dipper is in operation. The resistance wire 26 is insulated from the scoop 10 by any of a variety of well-known means, such as by a thin film of insulation material 30 on both sides of the heating element, which is then bonded or otherwise fixed to the convex side of the scoop 10.

Certain other modifications must be made in the dipper to accommodate this embodiment. The pin 11' must provide insulation around electrical conductors and must be equipped with exposed conductors 31 that are attached to the ends of the resistance wire 26, which may receive electrical energy therefrom via brushes 32 fixed to the arm 6. These brushes are connected to a connector 33 fixed to the inner end of the arm 6, which fits into electrical receptacle 34 in the knife handle 7. The receptacle 34 is connected across the switch 29 so that the heating element 26 may be energized together with the motor 28.

A number of variations could be used in place of the motion adapting mechanism as shown. For example, the bars 16 may have rack gears that engage a pinion gear on the scoop 10; a belt and sheaves could be used, etc.

Although the embodiments described are satisfactory for ordinary use when care is taken to position the dipper with the scoop member 10 downward, it is desirable to seal the knife handle against liquids when heavy use is intended. This is easily accomplished by a rubber band 35 or other seal seated in a groove in the edge of one of the half shells 36, of the knife handle housing; so that the components thereof have sealed interfaces. Also, a hollow, rubber guard enclosure 37 may be fitted over the receptacle well 38 of the knife handle to enclose the motion adapting mechanism 14, provision being made for the pivot stud 19 of the yoke 18 to extend therethrough in sealed relationship. A seal 39 may also be provided at the base of the enclosure 37 to make its interface with the knife handle liquid tight.

The heating element 26 is of rather low power, since it is desirable to bring the temperature of the scoop 10 approximately to room temperature so that only a thin film of the ice cream necessary to release it easily may be melted.

It will be noted that the arm 6 of the dipper apparatus attaches to one of the lateral sides of the knife handle 7 so that the scoop 10 is oriented at right angles to the normal position of knife blades therein. This has been found to afford the most comfortable position for the operator in dipping ice cream. In practice, the operator simply depresses the switch 29, which simultaneously energizes both the motor and the heating element, and dips the ice cream as with a conventional dipper. A slight lateral, rolling motion of the dipper then easily releases the scooped ice cream into another container.

An invention has been described that provides an advance in the ice cream dipper art. Although the embodiments have been described with considerable specificity regarding detail, it should be noted that many such details may be altered without departing from the scope of the invention, as it is defined in the following claims.

The invention claimed is:

1. An ice cream dipper apparatus attachable to an electric knife handle having reciprocal actuators, comprising:
   an arm having an inner end attachable to an electric knife handle;
   a concavo-convex scoop pivotally attached at its center to the outer end portion of the arm; and
   means for transferring reciprocal motion of the knife handle actuators to the scoop, comprising: a yoke pivotally attached to the arm; a pair of reciprocating bars, each of which bears at one end against an end portion of the yoke and is attachable at its other end to one of the actuators in the knife handle, whereby the yoke may be rotated, in reciprocal motion, about its pivotal attachment to the arm; and means for transferring motion from the yoke to the scoop.

2. The dipper apparatus of claim 1 including electrical heating means on the scoop to facilitate release of ice cream therefrom.

3. The dipper apparatus of claim 2 wherein the heating means is an insulated, electrical resistance wire on the scoop that is connectable to the power source of the knife handle.

4. The dipper apparatus of claim 1 wherein the scoop has sharpened, serrated edges to facilitate cutting of frozen ice cream.

5. The scoop apparatus of claim 1 including a release agent on at least the inner surface of the scoop to facilitate release of ice cream therefrom.

6. The dipper apparatus of claim 1 wherein the scoop is narrowed laterally, so that it comprises less than a hemisphere, to facilitate removal of ice cream therefrom.

7. The dipper apparatus of claim 1 wherein the yoke is engageable to the scoop by a crank-in-slot engagement means, wherein a crank on one of said members engages a slot in the other.

8. The dipper apparatus of claim 1 wherein each of the reciprocating bars is engageable to an end portion of the yoke by stud-in-slot engagement means, wherein a stud in one of said members engages a slot in the other.

9. The dipper apparatus of claim 1 including rigid, radial fingers on the outer end of the arm, curved around the convex side of the scoop member to limit movement thereof to rotary movement about its attachment to the arm, and to provide bearing support therefor.

* * * * *